United States Patent [19]

Yanagi

[11] Patent Number: 4,593,333
[45] Date of Patent: Jun. 3, 1986

[54] MAGNETIC HEAD
[75] Inventor: Michio Yanagi, Chichibu, Japan
[73] Assignee: Canon Kabushiki Kaisha, Tokyo, Japan
[21] Appl. No.: 456,715
[22] Filed: Jan. 10, 1983
[30] Foreign Application Priority Data Jan. 18, 1982 [JP] Japan .................................. 57-5797

[51] Int. Cl.⁴ ............................................. G11B 7/12
[52] U.S. Cl. .................................. 360/125; 360/120;
360/127; 360/126; 428/68; 428/70; 428/76;
428/416; 428/418; 428/694; 428/900
[58] Field of Search ............... 360/120, 125, 127, 126,
360/122, 110; 428/694, 900, 416, 418, 68, 70,
76; 427/128

[56] References Cited
U.S. PATENT DOCUMENTS 3,535,466 10/1970 Foster .................................. 360/120
3,829,354 8/1974 Bertram .............................. 428/416
4,127,695 11/1978 Hirakawa ........................... 428/416
4,298,656 11/1981 Mendlesohn ....................... 428/416
4,381,529 4/1983 Bouwma ............................ 360/123
4,413,295 11/1983 Kato ................................... 360/120

OTHER PUBLICATIONS

L. J. Poch, "Magnetic Head", IBM Tech. Discl. Bull., vol. 2, (No. 1), Jun. 1959.

Primary Examiner—Ellis P. Robinson
Attorney, Agent, or Firm—Fitzpatrick, Cella, Harper & Scinto

[57] ABSTRACT

A magnetic head comprises a magnetic head element constituted of a core composed of a material of high permeability, a case for the magnetic head element, the magnetic head element being fixed into said case with a fixing material which comprises a plurality of epoxy resins having different number of epoxy groups from each other.

10 Claims, 2 Drawing Figures

MAGNETIC HEAD

BACKGROUND OF THE INVENTION

1. Field of the Invention

This invention relates to a magnetic head, and more particularly, to a magnetic head comprising a magnetic core fixed in a case by using a fixing material comprising a plurality of epoxy resins having different number of epoxy groups from each other.

2. Description of the Prior Art

An ordinary magnetic head is as illustrated in FIG. 1 which is a front view of the magnetic head and in FIG. 2 which is a cross sectional view of the magnetic head of FIG. 1 taken along the dot and dash line A—A', and the cross section is viewed from the upper portion of FIG. 1.

In FIG. 1 and FIG. 2, reference numeral 1 denotes a core, 2 a case, 3 a fixing material, 4 a gap, 5 a spacer, 6 an intercepting plate, 7 a coil, 8 a terminal and 9 a sliding surface.

Degradation of electromagnetic converting characteristic is attributable to the following cause.

That is, fixing material 3 fixes core 1 (magnetic core) composed of a material of high permeability into case 2, but the difference in coefficient of linear expansion between fixing material 3 and the core results in a shrinking stress against core 1 when fixing material 3 is cured and shrinks.

After using the magnetic head for a long time after fixing material 3 is cured, fixing material 3 absorbs moisture in air. As a result, fixing material 3 is deformed and a stepwise difference is formed in the vicinity of gap 4, and therefore, a tape (not shown) can not closely contact sliding surface 9 of the head and the recording characteristics and reproduction characteristics are degraded.

For the purpose of decreasing such degradation of the electromagnetic converting characteristic, it is necessary to use a fixing material of low coefficient of linear expansion and low boiling water absorption. For the purpose of obtaining such fixing material, a certain amount of a filler, for example, calcium carbonate, silica, talc or a mixture thereof is added.

The above mentioned boiling water absorption is determined according to JIS (Japanese Industrial Standard) K6911-1979, 5.27, as shown below.

APPARATUS (1.1) Chemical balance
  Sensitivity is higher than 1 mg.
(1.2) Weighing bottle
  The size is sufficiently large to put in or take out the same piece.
(1.3) Beaker
  The volume is appropriate to put in the sample piece and boil it.
(1.4) Thermostat
  Capable of controlling to 50°±2° C.
(1.5) Desiccator
  Containing dried calcium chloride or silica gel.
(1.6) Thermometer
  Maximum 100° C., graduated by 1° C.

SAMPLE PIECE

Disc of 50±1 mm in diameter and 3±0.2 mm in thickness.

PRETREATMENT

The sample piece is dried in the thermostat kept at 50°±2° C. for 24±1 hours. The sample piece is placed on a filter paper placed on an asbestos plate of about 10 mm thick.

METHOD

The sample piece after the pretreatment was cooled to 20°±10° C. in the desiccator and the weight is measured accurately to 1 mg.

Then, after boiling the sample piece in a boiling distilled water for one hour, the sample piece is taken out, cooled in a running clean water at 20°±10° C. for 30 minutes, wiped with a dried and clean gauze, and the surface is swept with a feather or a brush, and then, within one minute, the sample piece is placed in the weighing bottle to measure accurately the weight after absorbing water to 1 mg. It is necessary to be careful such that the sample pieces do not touch each other during the boiling.

CALCULATION

The boiling water absorption is calculated as shown below.

$$A = \frac{W_2 - W_1}{W_1} \times 100$$

where A is the boiling water absorption (%), $W_1$ is the weight of the sample piece before boiling (g), and $W_2$ is the weight of the sample piece after boiling (g).

Heretofore, as the epoxy resin, there have been used bifunctional epoxy resins having two epoxy groups in a molecule, but the amount of the filler is maximum 70% by weight based on the total amount (i.e. sum of epoxy resins and the filler). The amount over 70% by weight results in increase in viscosity of epoxy resins and difficulty in casting the epoxy resins in a magnetic head. Though, for example, it is a remedy to impart a heat resistance by elevating the curing temperature of the adhesive, the inside portions and terminals of a magnetic core are adversely affected so that the prevention of deterioration of magnetic characteristics can be achieved only to a limited extent.

SUMMARY OF THE INVENTION

An object of the present invention is to provide a magnetic head which is substantially free from deterioration of electromagnetic converting characteristics due to a long time use of the magnetic head.

Another object of the present invention is to provide a magnetic head comprising a fixing material of low coefficient of linear expansion, low boiling water absorption, high heat resistance and high glass transition point.

A further object of the present invention is to provide a magnetic head comprising a fixing material whose self-curing is suppressed to make storing easy.

According to the present invention there is provided a magnetic head which comprises a magnetic head element constituted of a core composed of a material of high permeability, a case for the magnetic head element, the magnetic head element being fixed into said case with a fixing material which comprises a plurality of epoxy resins having different number of epoxy groups from each other.

DETAILED DESCRIPTION OF THE PREFERRED EMBODIMENTS

Figure 1:
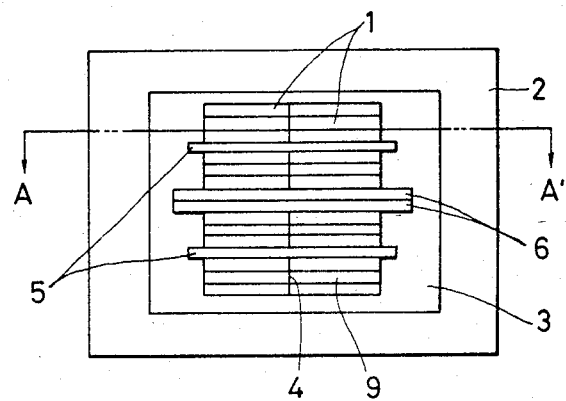
FIG. 1 is a front view of a magnetic head.
Figure 2:
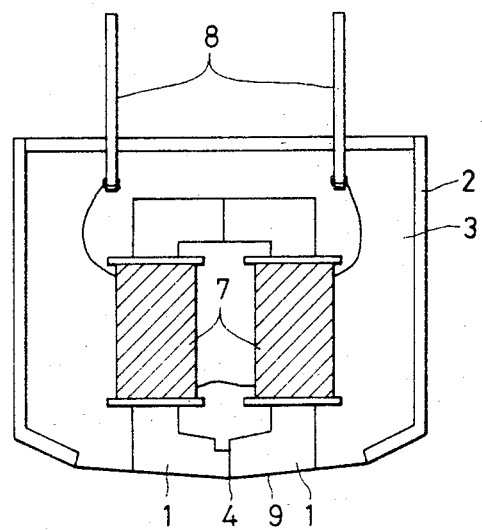
FIG. 2 is a cross sectional view of the magnetic head in FIG. 1 taken along the dot-and-dash line A—A'.

As stated previously, adhesives used as a fixing material for magnetic heads are mainly epoxy resins. The feature characteristics of the epoxy resin are attributable to the two epoxy groups present in a molecule. The most representative epoxy resin is of a bisphenol A/epichlorohydrin type, and a diepoxide having an epoxy group at each of both ends of the molecule chain.

The representative structural molecular formula is as shown below:

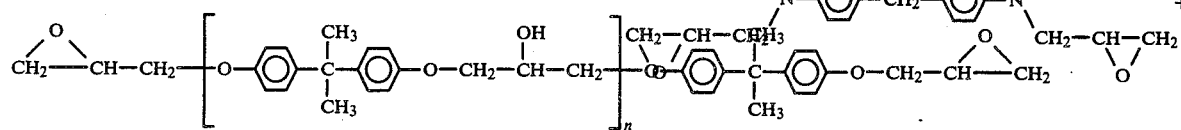

where n is zero to about 1.

As a curing agent, there may be used amine type (aromatic amine or aliphatic amine) acid anhydride compounds.

For example, the reaction of an amine type curing agent with epoxy groups is as shown below.

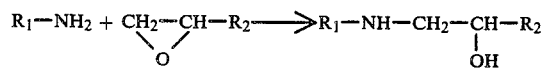

where $R_1$ and $R_2$ are alkyl.

Further, the product is reacted with another epoxy group as shown below.

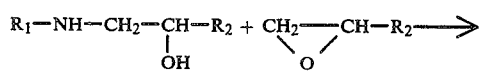

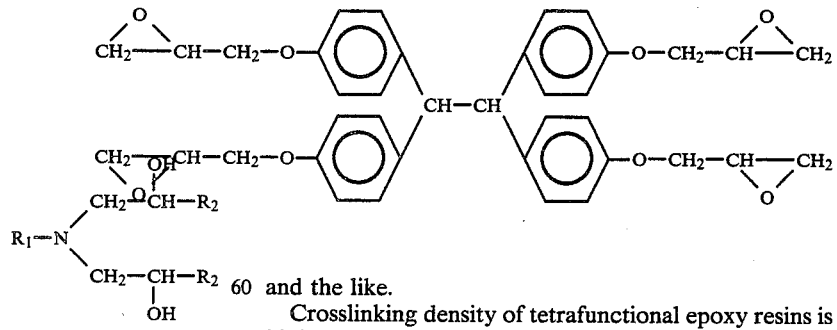

where $R_1$ and $R_2$ are as defined above. In this manner, epoxy rings are subsequently subjected to the ring opening reaction to cause curing.

There is known a tetrafunctional epoxy resin having four epoxy groups in a molecule which can make the molecule structure of the adhesive rigid.

Such epoxy resins having four functional groups in one molecule may be produced by dehydrochlorination of an amine type curing agent such as diaminodiphenyl methane (DDM), diaminodiphenyl sulfone (DDS), methylene dianiline (MDA) and the like and epichlorohydrin. For example, the reaction of DDM with epichlorohydrin proceeds as follows.

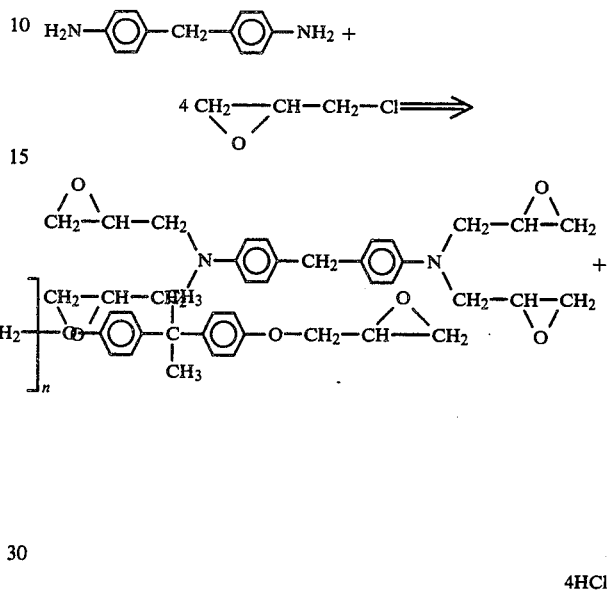

4HCl

Other than the above epoxy resin having four epoxy groups in a molecule, there may be mentioned glycidyl amine of the formula

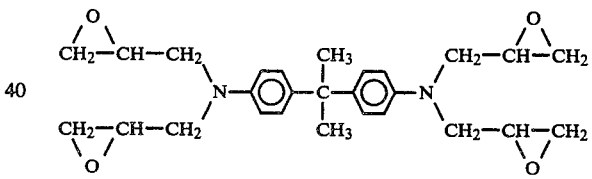

and the like.

In addition, there may be mentioned other epoxy resins such as tetraglycidyl ether

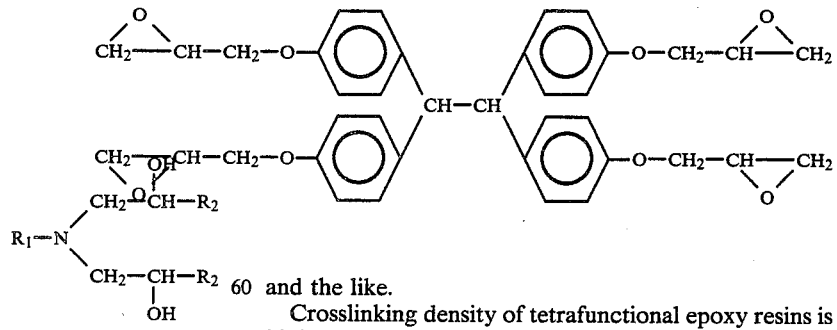

and the like.

Crosslinking density of tetrafunctional epoxy resins is higher than that of bifunctional epoxy resins so that coefficient of linear expansion and boiling water absorption of tetrafunctional epoxy resins are smaller than those of bifunctional epoxy resins.

Further, glass transition point, as a standard for evaluating heat resistance, of tetrafunctional epoxy resins is higher than that of bifunctional epoxy resins. Therefore, tetrafunctional epoxy resins are very suitable for a fixing material for magnetic heads.

However, when tetrafunctional epoxy resins alone are used as the fixing material, there is a problem. That is, tetrafunctional epoxy resins have epoxy groups and amino active hydrogen (Tetrafunctional epoxy resins are usually contaminated with trifunctional epoxy resin or the like and therefore the amino active hydrogen is present.)

And further, the lone pair electron of nitrogen acts as a catalyst for self-curing so that storing the tetrafunctional epoxy resins is difficult.

For example, when a tetrafunctional epoxy resin may be added to a bifunctional epoxy resin in an amount of 80% by weight or less based on the total amount of the bifunctional epoxy resin and the tetrafunctional epoxy resin. If the amount of tetrafunctional epoxy resin exceeds 80% by weight, self-curing occurs and the storing becomes impossible. On the contrary, if the amount of tetrafunctional epoxy resin is less than 10% by weight, there are not exhibited the advantageous effects of adding a tetrafunctional epoxy resin, i.e. small coefficient of linear expansion and boiling water absorption and high glass transition point.

Therefore, the amount of tetrafunctional epoxy resin to be added to bifunctional epoxy resin is preferably 10–80% by weight based on the total amount of the bifunctional epoxy resin and the tetrafunctional epoxy resin.

An example of the present invention is shown below.

Sample A is a material composed of 100% by weight of bifunctional epoxy resin, and Sample B is a material composed of 50% by weight of bifunctional epoxy resin and 50% by weight of tetrafunctional epoxy resin.

For the purpose of examining environmental stability of magnetic heads, acceleration tests were made to investigate change in electromagnetic converting characteristics under high temperature and high humidity.

Change in reproduction frequency characteristic of magnetic head between before and after the test at 12.5 KHz of frequency is shown in Table 1.

TABLE 1

| Tests (Temperature °C., humidity %, time Hr.) | Sample A | | Sample B | |
|---|---|---|---|---|
| | $\overline{\Delta X}$ (dB) | $3\sigma$ | $\overline{\Delta X}$ (dB) | $3\sigma$ |
| Humidity resistance test 70° C., 95%, 96 Hr | 1.44 | 5.01 | 0.29 | 0.78 |
| Heat resistance test 80° C., 65%, 96 Hr | 0.85 | 1.62 | 0.31 | 0.96 |
| Heat shock test −40° C./2 Hr → 80° C. · 65%/2 Hr | 1.42 | 2.52 | 0.56 | 0.93 |

TABLE 1-continued

| Tests (Temperature °C., humidity %, time Hr.) | Sample A | | Sample B | |
|---|---|---|---|---|
| | $\overline{\Delta X}$ (dB) | $3\sigma$ | $\overline{\Delta X}$ (dB) | $3\sigma$ |
| 8 cycles | | | | |

In Table 1 above, $\overline{\Delta X}$ stands for an absolute value of change in the frequency characteristic between before and after the test. $3\sigma$ stands for 3 times the standard deviation of the data.

Therefore, when both $\overline{\Delta X}$ and $3\sigma$ are small, the electromagnetic converting characteristic is good. This indicates that Sample B (the present invention) is much better than Sample A.

In the foregoing, there is shown an example where a tetrafunctional epoxy resin was added to a bifunctional epoxy resin.

Since the present invention comprises employing a plurality of epoxy resins having different functions, the present invention is not limited to the above mentioned example.

What is claimed is:

1. A magnetic head which comprises a magnetic head element constituted of a core composed of a material of high permeability, a case for the magnetic head element, the magnetic head element being fixed into said case with a fixing material which comprises a tetrafunctional epoxy resin and a bifunctional epoxy resin, the amount of tetrafunctional epoxy resin being 10–80% by weight based on the total amount of the bifunctional epoxy resin and the tetrafunctional epoxy resin.

2. A magnetic head according to claim 1 in which a filler is added to the fixing material.

3. A magnetic head according to claim 2 in which the filler is at least one member selected from the group consisting of calcium carbonate, silica and talc.

4. A magnetic head according to claim 2 in which the amount of the filler is 70% by weight or less based on the total amount of the filler, the bifunctional epoxy resin and the tetrafunctional epoxy resin.

5. A magnetic head according to claim 1, wherein the tetrafunctional epoxy resin is N,N,N',N'-tetraglycidyldiaminodiphenylmethane.

6. A magnetic head according to claim 5, in which a filler is added to the fixing material.

7. A magnetic head according to claim 6, wherein the amount of the filler is 70% by weight or less based on the total amount of the filler, the bifunctional epoxy resin and the tetrafunctional epoxy resin.

8. A magnetic head according to claim 6, wherein the filler is at least one member selected from the group consisting of calcium carbonate, silica and talc.

9. A magnetic head according to claim 4, wherein the filler is at least one member selected from the group consisting of calcium carbonate, silica and talc.

10. A magnetic head according to claim 8, wherein the filler is at least one member selected from the group consisting of calcium carbonate, silica and talc.

* * * * *

UNITED STATES PATENT AND TRADEMARK OFFICE
CERTIFICATE OF CORRECTION

PATENT NO. : 4,593,333
DATED : June 3, 1986
INVENTOR(S) : MICHIO YANAGI

It is certified that error appears in the above-identified patent and that said Letters Patent is hereby corrected as shown below:

IN [56] REFERENCES CITED

U.S. PATENT DOCUMENTS, "Mendlesohn" should read --Mendelsohn--.

COLUMN 3

Line 55, 

COLUMN 4

Line 20, 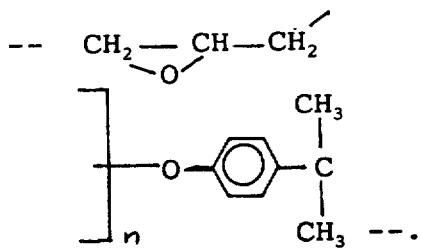

UNITED STATES PATENT AND TRADEMARK OFFICE
CERTIFICATE OF CORRECTION

PATENT NO. : 4,593,333
DATED : June 3, 1986
INVENTOR(S) : MICHIO YANAGI

It is certified that error appears in the above-identified patent and that said Letters Patent is hereby corrected as shown below:

COLUMN 5

Line 21, "the" should be deleted.

Signed and Sealed this

Twenty-third Day of July, 1991

Attest:

HARRY F. MANBECK, JR.

*Attesting Officer*     *Commissioner of Patents and Trademarks*